J. R. BEDGOOD.
TRACTOR ATTACHMENT FOR AUTOMOBILES.
APPLICATION FILED JULY 31, 1918.
1,324,951.
Patented Dec. 16, 1919.
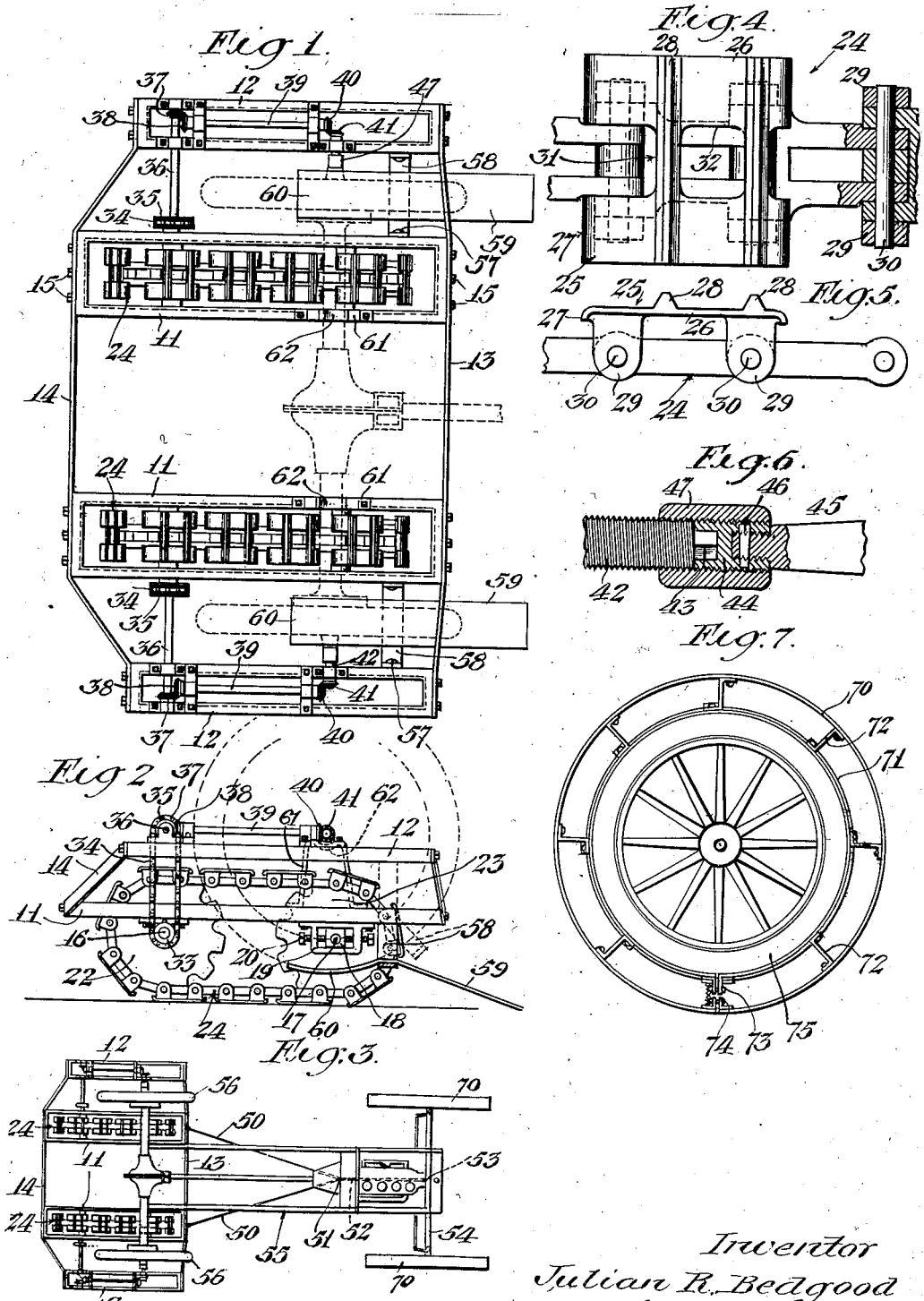
Inventor
Julian R. Bedgood
by Graham + Harris
Attorneys

UNITED STATES PATENT OFFICE.

JULIAN R. BEDGOOD, OF LOS ANGELES, CALIFORNIA.

TRACTOR ATTACHMENT FOR AUTOMOBILES.

1,324,951.  Specification of Letters Patent.  Patented Dec. 16, 1919.

Application filed July 31, 1918. Serial No. 247,683.

*To all whom it may concern:*

Be it known that I, JULIAN R. BEDGOOD, a citizen of the United States, residing at Los Angeles, in the county of Los Angeles and State of California, have invented a new and useful Tractor Attachment for Automobiles, of which the following is a specification.

My invention relates to an attachment which may be quickly connected to an automobile to utilize the automobile for a tractor, being particularly designed to be used in connection with a common form of automobile of the Ford type, and the principal object of my invention is to produce an attachment of the class described, of simple form and construction, which may be operated from the rear axle of the automobile without removing the wheels or other essential parts of the automobile.

Other objects and advantages will appear hereinafter from the following description and drawing.

Referring to the drawings, which are for illustrative purposes only,

Figure 1 is a plan view of the attachment, the position of the rear portion of the automobile being shown in dotted lines thereon.

Fig. 2 is a side elevation of the attachment shown in Fig. 1.

Fig. 3 is a plan view of the attachment as connected to the automobile chassis.

Fig. 4 is an enlarged plan view, partly in section, of the tractor chain.

Fig. 5 is a side elevation of the chain shown in Fig. 4.

Fig. 6 is an enlarged side elevation, partly in section, of the axle connection, and Fig. 7 is a side elevation of a form of tire to be used on the front wheels of the automobile.

The attachment consists of a general frame comprising two rectangular inner sections 11 formed of angle iron or other suitable material, and two outer sections 12 formed of angle iron or other light construction. The sections 11 and 12 are connected at the forward end by a bar 13 and at the rear ends by means of a bar 14, suitable bolts 15 being used for this purpose, as shown in Figs. 1 and 2.

Upon each section 11 is mounted a driving shaft 16 and a shaft 17 mounted in blocks 18, which blocks are adjustable in a cage 19 by means of suitable threaded bolts 20. Secured to each shaft 16 is a sprocket wheel 22, and loosely mounted upon each shaft 17 is a sprocket wheel 23. In each section 11 is a tractor chain 24 running over the respective sprockets 22 and 23. This chain 24 is provided with treads 25 which consist of plates 26 turned inwardly at their ends, as indicated at 27, and provided with ribs 28 extending across the plates, which add materially to the tractive power of the chain. Each plate 26 is provided with lugs 29 which are engaged by pins 30 of the chain to support the treads upon the chain. Each plate 26 is cut away, as indicated at 31 and 32. Such cut away portions permit the dirt or ground to work through thereby preventing a clogging of the chain about the treads.

The shafts 16 are each provided with sprocket wheels 33 driven by a chain 34 from a sprocket wheel 35 secured to a shaft 36 mounted upon the section 12. The shaft 36 has secured thereon a beveled gear 37 which is driven by a beveled gear 38 on a shaft 39, the shaft 39 being provided with a beveled gear 40 which meshes with a beveled gear 41 secured to a shaft 42, the shaft 42 and the shaft 39 being suitably mounted upon the section 12. The shaft 42, as shown in Fig. 6, is provided with a square end 43 which extends into a squared recess in a nut 44, the nut 44 being threaded onto the end of the rear axle 45 of the automobile. The nut 44 is securely held on the axle by means of a pin 46 and the shaft 42 is securely held in engagement with the nut 44 by means of a threaded sleeve 47 which engages the nut 44 and the threaded end of the shaft 42.

The tractor attachment is connected to the front axle of an automobile by means of rods 50 secured to the bar 13, the rods 50 extending forwardly and being connected at 51 to a bar 52 which bar 52 is connected in any suitable manner to the front axle 54 of the automobile, the chassis of the automobile being indicated as shown in Fig. 3 at 55 and the rear wheels of the automobile being shown as indicated at 56.

Pivotally mounted, as indicated at 57, between each section 11 and 12 is a stirrup 58 adapted to receive an inclined track 59, each track 59 having a curved rear portion 60 extending rearwardly from the stirrup for purposes hereinafter referred to. 61 indicates standards mounted upon the section 11, such standards being cupped or made with a depression indicated at 62 in their upper ends to form a seat to receive the rear axle of the automobile, as hereinafter referred to.

In connecting the attachment to the automobile the tracks 59 are placed in the position shown in Figs. 1 and 2, the bar 13 removed, and the rear wheels of the automobile backed up upon the track until they pass through the stirrups into the dotted line position shown in Fig. 2 in which position the rear axle of the automobile seats inself within the recess 62 in the respective standards 61, in which position the rear axle is in alinement with the shaft 42 and the connection between the shaft 42 and the ends of the axle 45 may be made as shown in Fig. 6. After such connection has been made it is understood the track 59 may be removed as the rear end of the automobile is now supported upon the tractor attachment.

If desired the front end of the automobile may be raised to correspond with the height of the rear portion of the machine. This may be done in different ways. Fig. 7 shows one means of accomplishing this result, a tire 70 being supported on a band 71 by means of an L shaped brace 72, the tire 70 and band 71 being split, the ends being connected by means of suitable bolts indicated at 73 and 74 respectively, the band 71 being formed to fit over the tread of the front tire 75.

When the attachment has been made it is to be understood that the engine of the automobile is operated to drive the rear axle in the usual manner, the rear axle transmitting power through the nut 44 to the shaft 42 which in turn, through the driving connections heretofore described, drives the shaft 16 with the sprocket wheels mounted thereon, the sprocket wheels 22 in turn driving the tractor chain 24, the tractor when so driven being used as a motive power for drawing any load to be moved, the connections being made from the attachment in any well known manner.

I claim as my invention:

1. In combination with the rear axle of an automobile, a tractor comprising a frame, a pair of shafts mounted in said frame, a sprocket wheel on each shaft, a tractor chain on each sprocket wheel, standards on said frame each formed with a seat to support the rear axle of the automobile, a pair of driven shafts mounted on said frame, means for connecting said driven shafts to the rear axle of the automobile, and means for connecting said driven shafts to the sprocket wheel shafts in said frame to drive the tractor chains.

2. In combination with an automobile, a tractor comprising a frame arranged to support the rear axle of the automobile, tractor chains mounted in said frame, a driven shaft on said frame for each end of said rear axle, means for driving said chains from said shafts, and means for connecting said shafts to the rear axle of the automobile, said connecting means consisting of a nut threaded on the end of the axle and having a squared recess in one end thereof, a square end formed on the shaft extending into the recess in the nut, and a threaded sleeve extending over and engaging threads formed on said shaft and the outer face of said nut.

3. In combination with the rear axle of an automobile, a tractor comprising a frame having inner and outer sections, tractor chains mounted in said inner sections, a driven shaft mounted on each outer section, means for connecting said driven shafts to the ends of the rear axle, means for driving the tractor chains from said driven shafts, seats mounted on said inner sections to support the rear axle thereon, and means for supporting track means on said tractor to receive the rear wheels of the automobile to raise the rear axle to the said seat.

In testimony whereof, I have hereunto set my hand at Los Angeles, California, this 25th day of July, 1918.

JULIAN R. BEDGOOD.